United States Patent
Werner

(10) Patent No.: US 7,150,180 B2
(45) Date of Patent: Dec. 19, 2006

(54) DETECTION OF LEAKS IN HEAT EXCHANGERS

(75) Inventor: Thomas Werner, Cannington Nr. Bridgewater (GB)

(73) Assignee: Accusense System Limited, Bridgewater (GB)

( * ) Notice: Subject to any disclaimer, the term of this patent is extended or adjusted under 35 U.S.C. 154(b) by 120 days.

(21) Appl. No.: 11/018,510

(22) Filed: Dec. 22, 2004

(65) Prior Publication Data

US 2005/0109083 A1 May 26, 2005

Related U.S. Application Data

(63) Continuation of application No. 10/149,184, filed as application No. PCT/GB00/04745 on Dec. 8, 2000, now abandoned.

(30) Foreign Application Priority Data

Dec. 8, 1999 (GB) .................................. 9929062.9

(51) Int. Cl.
*G01M 3/04* (2006.01)
(52) U.S. Cl. .......................................... 73/40.7; 73/40
(58) Field of Classification Search ................. 73/40.7, 73/40
See application file for complete search history.

(56) References Cited

U.S. PATENT DOCUMENTS

| 3,087,327 | A |   | 4/1963  | Kagi             |         |
|-----------|---|---|---------|------------------|---------|
| 3,425,264 | A |   | 2/1969  | Frei             |         |
| 4,688,627 | A | * | 8/1987  | Jean-Luc et al.  | 165/11.1|
| 5,022,265 | A |   | 6/1991  | Voss             |         |
| 5,835,976 | A |   | 11/1998 | Kent et al.      |         |
| 5,872,308 | A | * | 2/1999  | Bowling          | 73/40   |
| 6,009,745 | A |   | 1/2000  | Shaw et al.      |         |
| 6,035,700 | A |   | 3/2000  | Shaw             |         |
| 6,044,692 | A | * | 4/2000  | Bowling          | 73/40.7 |
| 6,050,133 | A |   | 4/2000  | Achter et al.    |         |
| 6,062,068 | A |   | 5/2000  | Bowling          |         |
| 6,314,794 | B1|   | 11/2001 | Seigeot          |         |

FOREIGN PATENT DOCUMENTS

GB        2314421       12/1997

* cited by examiner

*Primary Examiner*—Daniel S. Larkin
*Assistant Examiner*—Rodney Frank
(74) *Attorney, Agent, or Firm*—Banner &Witcoff

(57) ABSTRACT

A method for detection of leaks in a plate pack heat exchanger having respective discrete first and second flow paths in mutual thermal contract comprises connecting a helium detector probe at one end of the first flow path and an air compressor means at the other end of the first flow path, introducing helium to the second flow path, allowing air to pass through the first flow path under the influence of the compressor means and detecting any helium present therein by the helium detector probe, the pressure of the second flow path being higher than that of the first flow path.

13 Claims, 1 Drawing Sheet

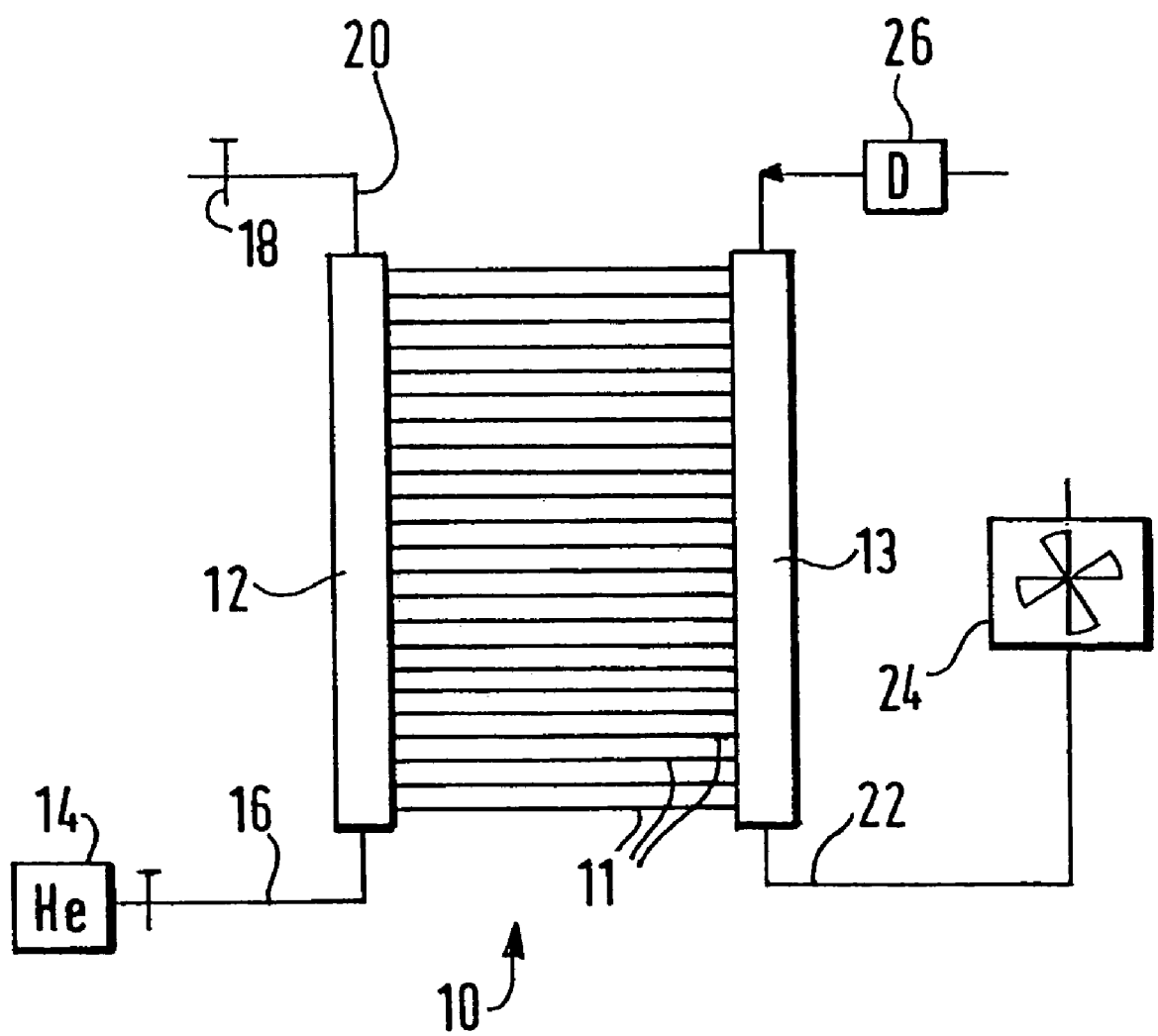

DETECTION OF LEAKS IN HEAT EXCHANGERS

This application is a continuation of prior filed U.S. application Ser. No. 10/149,184, filed Oct. 15, 2002 now abandoned, which is a U.S. National Phase Application Under 35 U.S.C. 371 and applicant herewith claims the benefit of priority of PCT/GB00/04745 filed Dec. 8, 2000, which was published under PCT Article 21(2) in English, which claims priority to Application No. 9929062.9 filed in Great Britain on Dec. 8, 1999, the entirety of which is hereby incorporated by reference

BACKGROUND OF INVENTION

This invention relates to heat exchangers and in particular provides an improved method for detection of leaks in plate pack heat exchangers, especially for use in the food and drinks industry.

British Patent No. 2314421 describes a method of testing a plate pack heat exchanger for leaks, the heat exchanger having discrete first and second flow paths in thermal contact, the method comprising connecting a gas circulation system including a helium detector probe across the first flow path; emptying the second flow path of any liquid and introducing helium; and using the helium detection probe to detect any helium in the first flow path.

While the method described in my earlier British patent represents a way of using commercially-available helium detectors to test heat exchangers for leaks in a simple and economical manner, it has been found in practice that detection times are slow, typically around 20 minutes from introduction of the helium, or even several times longer if any residual water is present in the second flow path, requiring the helium to diffuse through the water or other liquid.

It is an object of the present invention to provide a method for detection of leaks in heat exchangers and which provides a faster result, in that the absence of leaks can be reliably determined after only a few minutes, rather than having to wait for at least 20 minutes, especially when used in the presence of water or other liquid.

Accordingly, the present invention provides a method for detection of leaks in a plate pack heat exchanger having respective discrete first and second flow paths in mutual thermal contract, the method comprising connecting a helium detector probe at one end of said first flow path and an air compressor means at the other end of said first flow path, introducing helium to said second flow path, allowing air to pass through said first flow path under the influence of the compressor means and detecting any helium present therein by the helium detector probe, the pressure of the second flow path being higher than that of the first flow path.

In using the method of the present invention, the air compressor preferably operates at relatively low pressures, sufficient to drive air at from 15 to 30 cu. ft./min. through the first flow path against an outlet of atmospheric pressure. By using an open-ended flow path for the detection probe, a faster and more accurate result is achieved compared with the prior art method in that the helium detected is quantitatively representative of the scale of the leak, whereas in the prior art method the helium concentration increases as it accumulates in the closed recirculating system.

Desirably, both flow paths are emptied of as much liquid as possible before carrying out the method of the invention although fast response times are still achieved in the presence of water. The second flow path, containing the introduced helium, is also preferably open-ended, more preferably with a flow restrictor or throttle, at the downstream end, whereby the helium or helium-containing gas bleeds through the secondary flow path under a positive pressure, to enhance leak-detection effectiveness while forming a dynamic rather than a static system. The pressure at which the helium is introduced preferably does not exceed 20 psig.

The helium detector probe preferably detects helium present in the primary flow path on the basis of thermal conductivity.

An embodiment of the invention will now be described by way of example with reference to the accompanying drawing, which illustrates schematically one form of leak detection apparatus applied to a heat exchanger.

In the drawing, the heat exchanger is shown generally at 10 and includes heat exchange elements in the form of plates 11 extending between primary and secondary chambers 12, 13 respectively. The chambers have inlets and outlets (not shown) for supply and removal of heat exchange liquids. The chambers are in thermal contact with each other via the plates but are intended to be isolated from each other for mass transfer.

For the purpose of leak detection, the primary chamber 12 is provided at one end with a source of helium gas 14 and a supply line 16. At the other end of the chamber 12 is provided a tap 18 disposed in a take-off line 20. The secondary chamber 13 is provided at one end with an air pressure supply line 22 connected to a compressor 24 and at the other end with a helium detector probe 26.

In use and following removal of the heat exchange liquids from the primary and secondary chambers, the compressor 24 is started and flow of air at atmospheric pressure through the secondary chamber is established. Helium is then introduced in the primary chamber and allowed to flow out though the tap 18 in the open condition. The tap is then partially closed so that helium continues to flow through the primary chamber under a moderate positive pressure. Helium will flow through any leaks between the primary and secondary chambers under the influence of the differential pressure therebetween and will be detected by the detector probe 26. Detection of any leaked helium can be expected to take place after approximately 5 minutes of operation, even in the presence of water.

The invention claimed is:

1. A method for detection of leaks in a plate pack heat exchanger having respective discrete first and second flow paths in mutual thermal contact, the method comprising connecting a helium detector probe at one end of said first flow path and an air compressor means at the other end of said first flow path, said first flow path being open to atmosphere at each end, introducing helium to said second flow path, allowing air to pass through said first flow path under the influence of the compressor means while said one end is open to the atmosphere and detecting any helium present therein by the helium detector probe, the pressure of the second flow path being higher than that of the first flow path.

2. The method according to claim 1, in which the air compressor operates at a pressure sufficient to drive air at from 15 to 30 cu. ft./min. through the first flow path against an outlet of atmospheric pressure.

3. The method according to claim 1 or claim 2, in which the second flow path is substantially emptied of liquid before introduction of helium therein.

4. The method according to claim 1 or claim 2, in which both flow paths are substantially emptied of liquid.

5. The method according to claim 1, in which the second flow path is also open-ended.

6. The method according to claim 3, in which the second flow path is also open-ended.

7. The method according to claim 5, in which the second flow path is provided with a flow restrictor or throttle at the downstream end.

8. The method according to claim 1, in which the pressure at which the helium is introduced does not exceed 20 psig.

9. The method according to claim 3, in which the pressure at which the helium is introduced does not exceed 20 psig.

10. The method according to claim 1, in which the helium detector probe detects helium present in the primary flow path on the basis of thermal conductivity.

11. The method according to claim 3, in which the helium detector probe detects helium present in the primary flow path on the basis of thermal conductivity.

12. A heat exchanger comprising discrete first and second flow paths in mutual thermal contact, the heat exchanger including a helium detector probe at one end of said first flow path, said one end open to the atmosphere, and an air compressor means at the other end of said first flow path and a source of helium connected to said second flow path.

13. The heat exchanger according to claim 12, including means to maintain the pressure in said second flow path higher than the pressure in said first flow path.

* * * * *